(12) United States Patent
Mizutani et al.

(10) Patent No.: US 11,465,424 B2
(45) Date of Patent: Oct. 11, 2022

(54) PRINTING DEVICE HAVING RFID READER FREE FROM EXTERNAL FORCE

(71) Applicant: BROTHER KOGYO KABUSHIKI KAISHA, Nagoya (JP)

(72) Inventors: Hiromitsu Mizutani, Ichinomiya (JP); Kentaro Murayama, Kasugai (JP); Shota Iijima, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 262 days.

(21) Appl. No.: 16/830,013

(22) Filed: Mar. 25, 2020

(65) Prior Publication Data
US 2020/0398587 A1 Dec. 24, 2020

(30) Foreign Application Priority Data

Jun. 24, 2019 (JP) .............................. JP2019-116293

(51) Int. Cl.
| | |
|---|---|
| *B41J 3/407* | (2006.01) |
| *B41J 32/00* | (2006.01) |
| *B41J 11/66* | (2006.01) |
| *B41J 3/50* | (2006.01) |
| *G06K 19/077* | (2006.01) |
| *B41J 15/04* | (2006.01) |

(52) U.S. Cl.
CPC ............... *B41J 3/4075* (2013.01); *B41J 3/50* (2013.01); *B41J 11/663* (2013.01); *B41J 15/044* (2013.01); *B41J 32/00* (2013.01); *G06K 19/07718* (2013.01)

(58) Field of Classification Search
None
See application file for complete search history.

(56) References Cited

U.S. PATENT DOCUMENTS

| | | | |
|---|---|---|---|
| 2012/0039651 A1 | 2/2012 | Yamaguchi et al. | |
| 2017/0249107 A1* | 8/2017 | Nakagawa | G06K 15/186 |
| 2018/0086101 A1* | 3/2018 | Uematsu | B41J 2/365 |
| 2018/0311970 A1* | 11/2018 | Suzuki | B41J 2/362 |

FOREIGN PATENT DOCUMENTS

| | | | | |
|---|---|---|---|---|
| CN | 107962875 A | * | 4/2018 | ............ B41J 3/00 |
| JP | 2004115140 A | * | 4/2004 | ............ B41J 11/703 |
| WO | 2006/033393 A1 | | 3/2006 | |

* cited by examiner

*Primary Examiner* — Leslie J Evanisko
(74) *Attorney, Agent, or Firm* — Kenealy Vaidya LLP

(57) ABSTRACT

A printing device includes a printing mechanism, a first member, a second member and a RFID. The printing mechanism is configured to perform printing. The first member has a portion constituting a receiving portion. The receiving portion configured to receive therein a holder. The holder retains therein a consumable goods and is provided with a RFID. The holder is contactable with the portion of the first member when the holder is attached to the receiving portion. The second member is movable relative to the first member. The RFID reader is provided at the second member and is configured to read data stored in the RFID.

16 Claims, 7 Drawing Sheets

PRINTING DEVICE HAVING RFID READER FREE FROM EXTERNAL FORCE

CROSS REFERENCE TO RELATED APPLICATION

This application claims priority from Japanese Patent Application No. 2019-116293 filed Jun. 24, 2019. The entire content of the priority application is incorporated herein by reference.

TECHNICAL FIELD

The present disclosure relates to a printing device, and more particularly, to the apparatus provided with RFID reader.

BACKGROUND

International Publication No. WO2006/033393 discloses a printer including a cassette receiving portion configured to receive a cassette. The cassette has a bottom surface provided with a wireless tag circuit element such as RFID (radio-frequency identifier). The cassette receiving portion has a bottom wall portion provided with an antenna such as RFID reader.

SUMMARY

In a case where external force is applied to the printer, for example, when the printer falls, the external force is likely to be propagated to the antenna through the bottom wall portion of the cassette receiving portion. The antenna is likely to be affected by the external force.

It is therefore an object of the disclosure to provide a printing device capable of permitting the RFID reader to be free from the external force.

This and other objects will be attained by providing a printing device including a printing mechanism, a first member, a second member and a RFID. The printing mechanism is configured to perform printing. The first member has a portion constituting a receiving portion. The receiving portion configured to receive therein a holder. The holder retains therein a consumable goods and is provided with a RFID. The holder is contactable with the portion of the first member when the holder is attached to the receiving portion. The second member is movable relative to the first member. The RFID reader is provided at the second member and is configured to read data stored in the RFID.

BRIEF DESCRIPTION OF THE DRAWINGS

The particular features and advantages of the disclosure will become apparent from the following description taken in connection with the accompanying drawings, in which.

DETAILED DESCRIPTION

Figure 1:
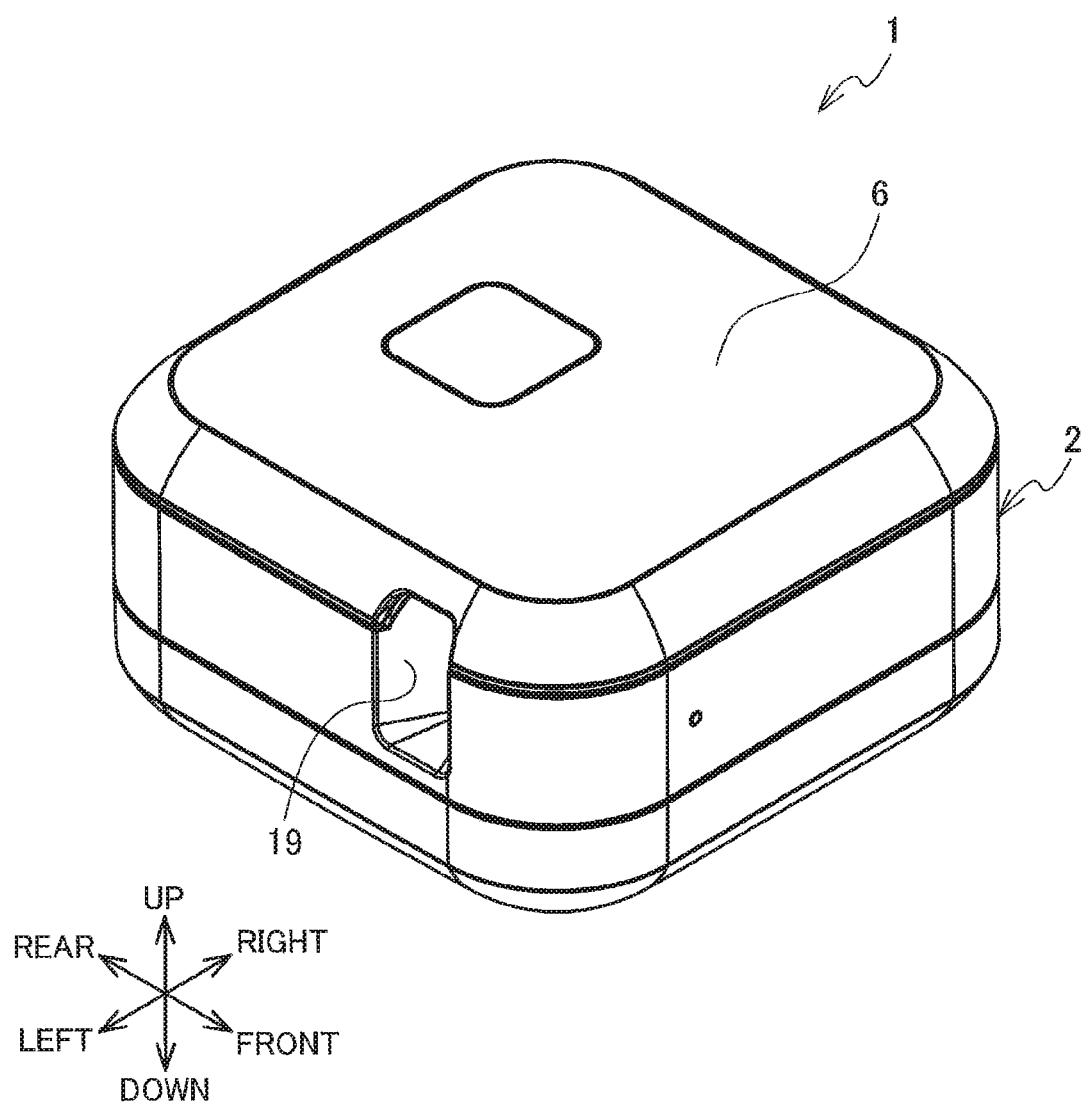
FIG. 1 is a perspective view of a printing device according to one embodiment.

A printing device 1 according to one embodiment will be described with reference to FIGS. 1 through 5. The terms "upward", "downward", "upper", "lower", "above", "below", "beneath", "right", "left", "front", "rear" and the like will be used throughout the description assuming that the printing device 1 is disposed in an orientation in which it is intended to be used. In use, the printing device 1 is disposed as illustrated in FIG. 1. A thermal printer is exemplified as the printing device 1.

Figure 2:
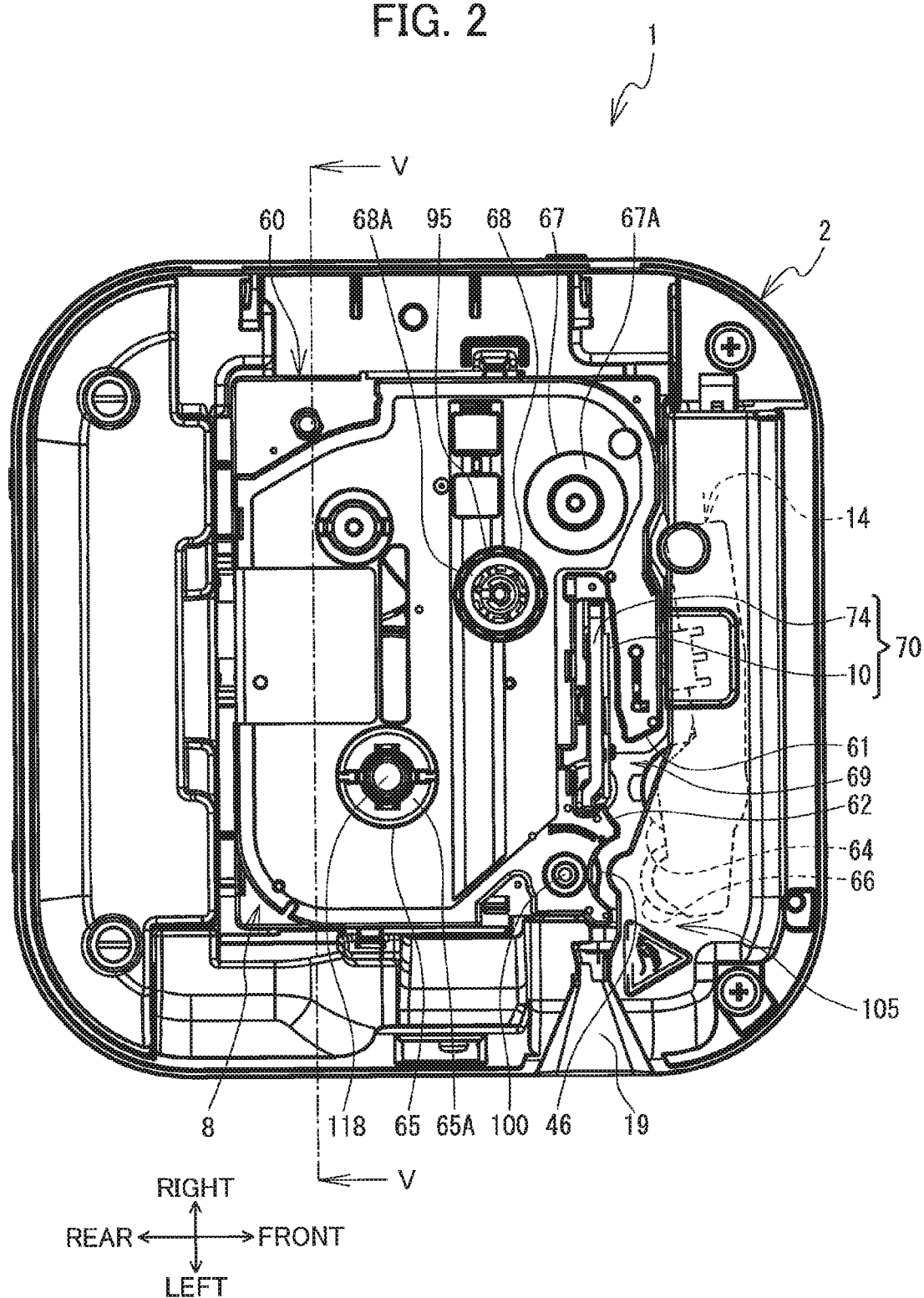
FIG. 2 is a plan view of the printing device whose lid 6 is removed.

As illustrated in FIGS. 1 and 2, the thermal printer 1 includes a housing 2 having generally rectangular parallelepiped shape. The housing 2 has a left front portion formed with a discharge opening 19 for discharging a tape 5 (FIG. 3) therethrough. A receiving portion 8 opening upward is provided inside the housing 2. The receiving portion 8 includes an auxiliary shaft 118 extending in upward/downward direction. A lid 6 is supported by the housing 2 and is movable between an open position opening the receiving portion 8 and a closed position closing the receiving portion 8.

Figure 3:
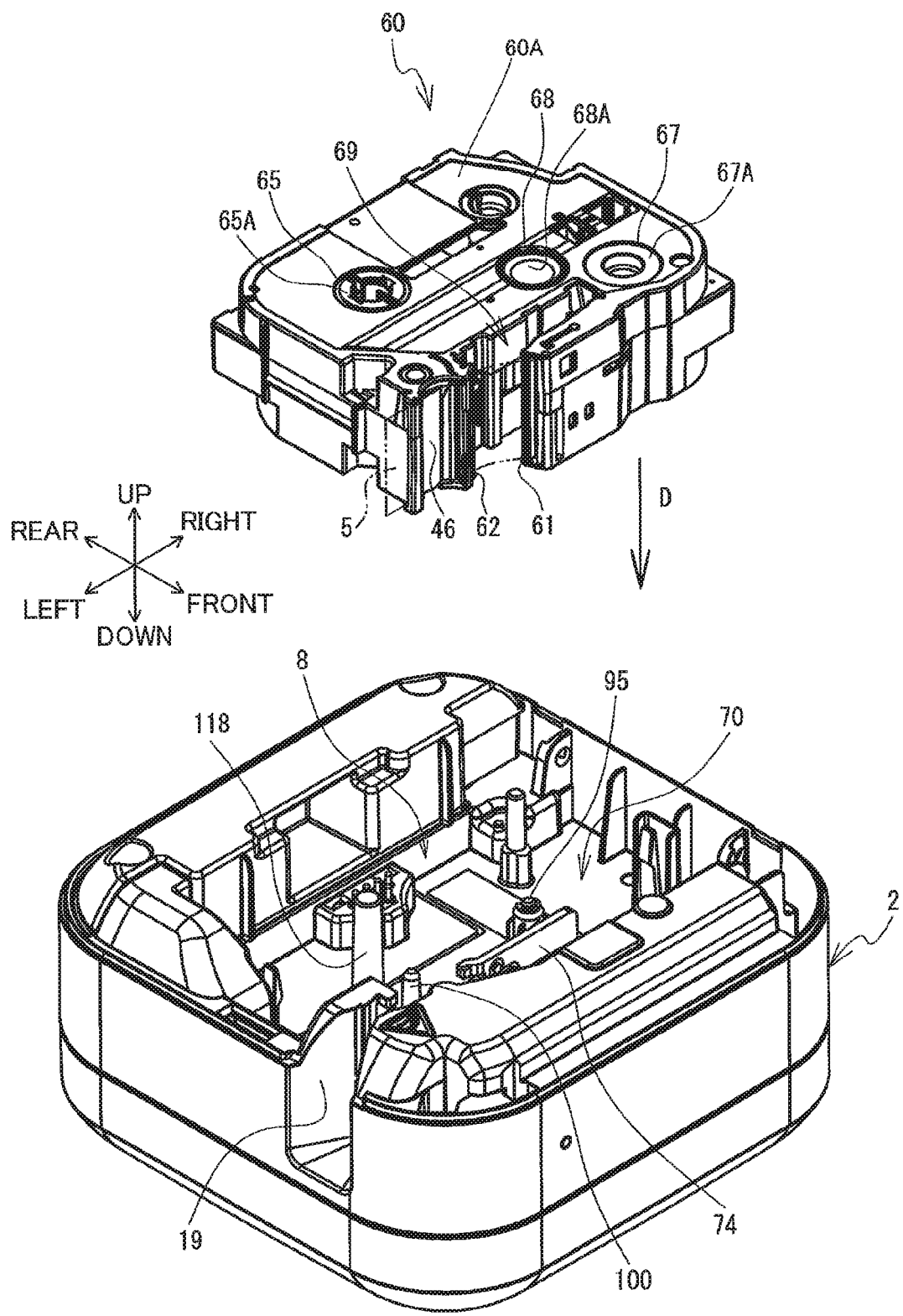
FIG. 3 is a perspective view particularly illustrating a receiving portion 8 of the printing device and a tape cassette 60 to be received in the receiving portion.

The receiving portion 8 is configured to receive various types of tape cassettes 60 retaining the consumable goods. FIG. 3 illustrates one example of a receptor type tape cassette 60 retaining a tape on which an image is to be printed. The tape 5 has a width extending in upward/downward direction. The tape is an example of a "consumable goods", and the tape cassette 60 is an example of a "holder".

The tape cassettes 60 of various kinds includes tapes 5 of various kinds whose widthwise length is different from each other. A laminate type tape cassette is also available instead of the receptor type. The tape cassette 60 is attachable to the receiving portion 8 by downward movement of the tape cassette 60 as indicated by an arrow D. The downward direction will occasionally be referred to as "first direction". The first direction is coincident with the attachment direction of the tape cassette 60. A user can select desired tape 5 by selecting the tape cassette 60.

The tape cassette 60 includes a casing 60A, a tape drive roller 46, a tape spool 65A, an ink ribbon spool 67A, and an ink ribbon take-up spool 68A those accommodated in the casing 60A. The casing 60A is formed with support holes 65, 67, 68, a first guide opening 61, and a second guide opening 62. The casing 60A also defines a head opening 69. The tape 5 is wound over the tape spool 65A. A non-used ink ribbon (not illustrated) is wound over the ink ribbon spool 67A, and a used ink ribbon is wound over the ink ribbon take-up spool 68A.

The tape spool 65A is rotatably supported by the support hole 65. The ink ribbon spool 67A is rotatably supported by the support hole 67. The ink ribbon take-up spool 68A is rotatably supported by the support hole 68. The first guide opening 61 is configured to allow the ink ribbon and the tape 5 to be discharged therethrough. The second guide opening 62 is configured to allow the ink ribbon to be inserted therethrough.

The head opening 69 is open in the upward/downward direction and is open leftward. The head opening 69 is in communication with the first guide opening 61 and the second guide opening 62. The tape 5 and the ink ribbon discharged through the first guide opening 61 reach the second guide opening 62 through the head opening 69.

The tape drive roller 46 is rotatable at a position downstream of the second guide opening 62 in a conveying direction of the tape 5. The tape drive roller 46 is hollow cylindrical in shape.

The tape cassette 60 further includes a RFID 63 (FIG. 5) provided at an outer bottom surface of the casing 60A. The RFID 63 is a non-contact type IC tag configured to perform near field communication. Data indicative of at least a type of the tape cassette 60 and widthwise length of the tape is stored in the RFID 63.

Figure 4:
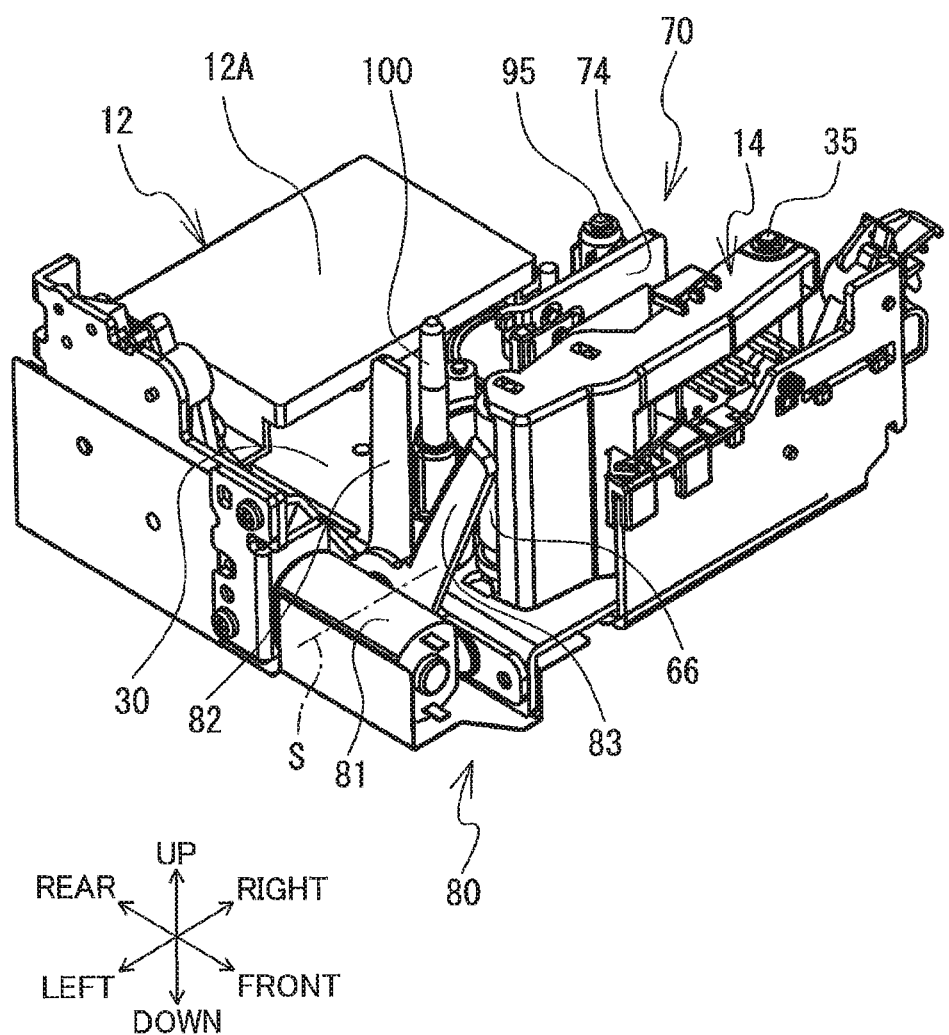
FIG. 4 is a perspective view illustrating a printing mechanism 70 and a cutting mechanism 80 in the printing device.

A base member 30 as illustrated in FIG. 4 is positioned below the receiving portion 8. The base member 30 is made from metal. An ink ribbon take-up shaft 95, a drive shaft 100, a printing mechanism 70, a conveyor motor (not illustrated), and a support shaft 35 are provided at the base member 30. The support shaft 35 extends upward from the base member 30 at a region outside of the receiving portion 8. The ink ribbon take-up shaft 95, and the drive shaft 100 extend upward from the base member 30 into an interior of the receiving portion 8, and are drivingly connected to the conveyor motor. The printing mechanism 70 includes a head holder 74 extending upward from the base member 30 into the interior of the receiving portion 8, and print head 10 (FIG. 2) positioned on a front surface of the head holder 74. The print head 10 is a thermal head including a plurality of heat generating elements arrayed in the upward/downward direction. The printing mechanism 70 is configured to perform printing on the tape 5.

In an attached state of the tape cassette 60 to the receiving portion 8, the ink ribbon take-up shaft 95 is fitted with the ink ribbon take-up spool 68A, the auxiliary shaft 118 is inserted into the tape spool 65A, and the drive shaft 100 is fitted with the tape drive roller 46. Further, the head holder 74 is inserted in the head opening 69. In the head opening 69, the ink ribbon is positioned rearward of the tape 5 and is superposed therewith.

Further, a platen holder 14 is accommodated in the housing 2 as illustrated in FIGS. 2 and 4. The platen holder 14 generally extends in leftward/rightward direction and has a right rear end portion rotatably supported by the support shaft 35, so that the platen holder 14 is pivotally movable about an axis of the support shaft 35. The platen holder 14 rotatably supports a platen roller 64 and a conveyor roller 66. The platen roller 64 is positioned to face the print head 10, and the conveyor roller 66 is positioned to face the tape drive roller 46. The conveyor roller 66 is positioned between the platen roller 64 and the discharge opening 19 (FIG. 1) in the conveying direction.

In accordance with opening/closing movement of the lid 6 relative to the receiving portion 8, the platen holder 14 is pivotally moved between a pressing position (not illustrated) and a retracted position (FIG. 2). At the pressing position, the platen roller 64 presses against the print head 10, and the conveyor roller 66 presses against the tape drive roller 46. At this time, the ink ribbon and the tape 5 are nipped between the platen roller 64 and the print head 10, and the tape 5 is nipped between the conveyor roller 66 and the tape drive roller 46. The ink ribbon is entered into the casing 60A of the take cassette 60 through the second guide opening 62 positioned upstream of the tape drive roller 46 in the conveying direction, and the ink ribbon is wound over the ink ribbon take-up spool 68A. The printed tape 5 moves past the conveyor roller 66 and the tape drive roller 46, and reaches the discharge opening 19.

At the retracted position of the platen holder 14, the platen roller 64 is moved frontward away from the print head 10, and the conveyor roller 66 is moved frontward away from the tape drive motor 46. Incidentally, the platen roller 64 is switched to driving phase drivingly connected to the conveyor motor upon pivotal movement of the platen holder 14 from the retracted position to the pressing position. A combination of the conveyor motor (not illustrated), the ink ribbon take-up shaft 95, the platen roller 64, and the drive shaft 100 will be referred to as a conveying mechanism 105 (FIG. 2). The conveying mechanism 105 is provided at the base member 30.

As illustrated in FIG. 4, a cutter mechanism 80 is provided at the base member 30 at a position between the conveyor roller 66 and the discharge opening 19 in the conveying direction. The cutter mechanism 80 includes a cutter motor 81, a fixed blade 82, and a movable blade 83. The fixed blade 82 is fixed to the base member 30. The movable blade 83 faces the fixed blade 82, and is pivotally movable about an axis S extending in the leftward/rightward direction. The cutter motor 81 is drivingly connected to the movable blade 83. Upon energization of the cutter motor 81, the movable blade 83 is pivotally moved about the axis S to cut the tape 5 in cooperation with the fixed blade 82.

A first member 11 is fixed to the base member 30. Specifically, the first member 11 is supported by the base member 30, and has a portion contactable with the tape cassette 80 attached to the receiving portion 8, and constitutes a part of the housing 2. In other words, the portion of the first member 11 constitutes a part of the receiving portion 8. The first member 11 is made from resin.

The first member 11 includes a first section 111, a second section 122 positioned rightward of the first section 111, and a third section 133. The first section 111 and the second section 122 are the portion constituting the part of the receiving portion 8. The first section 111 is connected to the base member 30. The second section 122 is connected to the base member 30. The third section 133 is not connected to the base member 30. A bottom end portion of the first section 111 and a bottom end portion of the second section 122 are connected to the third section 133. Specifically, the first section 111 is connected to the third section 133 by a screw (not illustrated), and the second section is connected to the third section 133 by a screw (not illustrated). The first section 111 and the second section 122 are separated from each other. More specifically, the first section 111 and the second section 122 are not directly connected to each other but indirectly (i.e. distantly) connected to each other through the third section 133 but are not directly connected with each other. Incidentally, the first section 111 and the second section 122 may be integrally formed.

Figure 5:
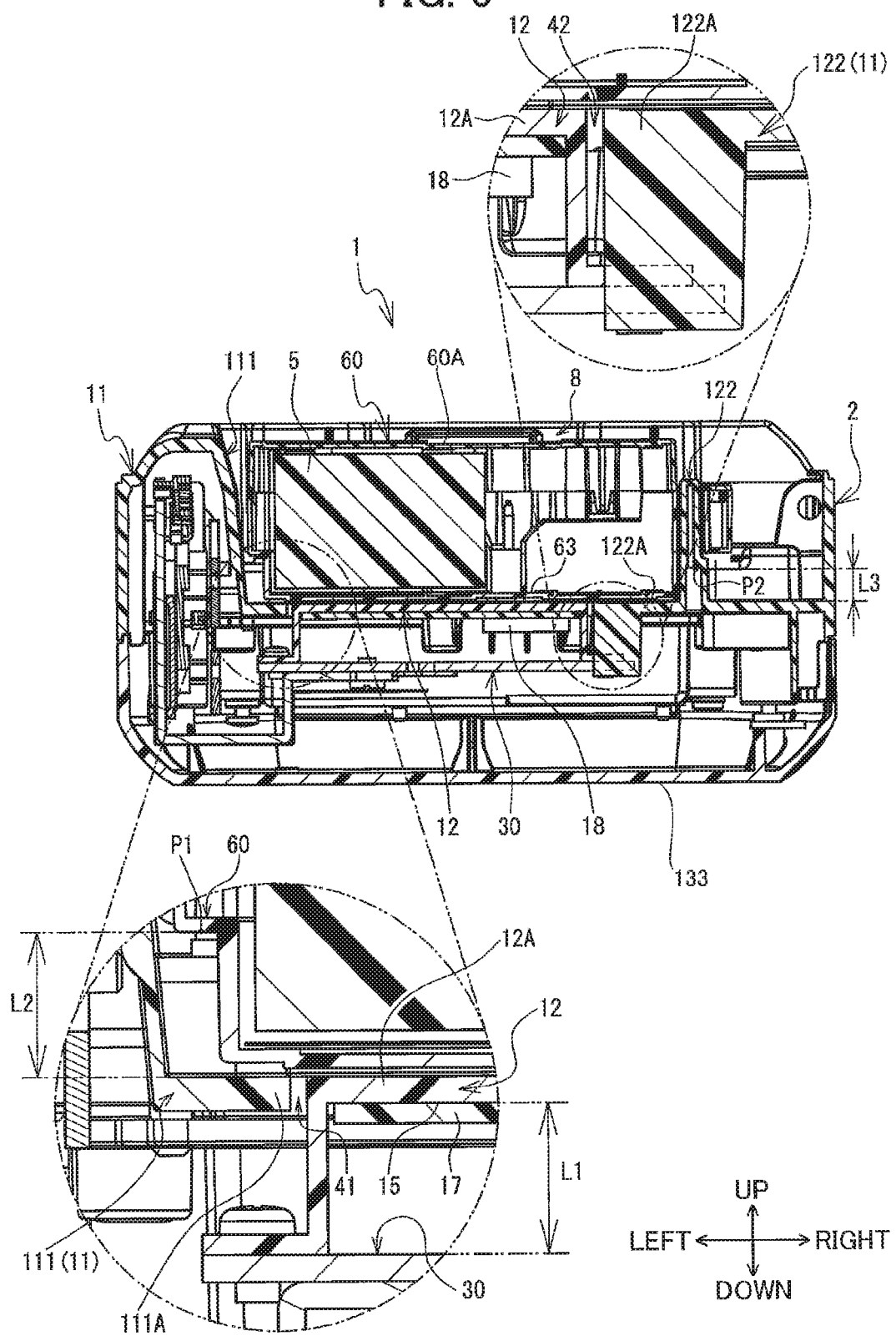
FIG. 5 is a cross-sectional view of the printing device and the tape cassette 60 taken along the line V-V in FIG. 2.

A second member 12 is fixed to the base member 30, as illustrated in FIG. 5. The first section 111 includes a first part 111A positioned closest to second member 12, and the second section 122 includes a first part 122A positioned closest to the second member 12. The first part 111A and the first part 122A are positioned below the tape cassette 60 attached to the receiving portion 8. That is, the first parts 111A and 122A are positioned forward of the tape cassette 60 in the first direction. The first parts 111A and 122A are positioned in-line in the leftward/rightward direction which will be occasionally referred to as "second direction" crossing the first direction.

The first section 111 contacts the tape cassette 60 at a contacting position P1 positioned above the first part 111A, and the second section 122 contacts the tape cassette 60 at a contacting position P2 positioned above the first part 122A. The first section 111 and the second section 122 constitute the part of the receiving portion 8.

As illustrated in FIG. 4, the second member 12 is positioned at a rear left portion of the base member 30. The second member 12 is made from resin. The second member 12 is separated from the first member 11. As illustrated in FIG. 5, a left end portion of the second member 12 is connected to a left end portion of the base member 30 by a screw. A right end portion of the second member 12 is connected to a right end portion of the base member 30 by a screw (not illustrated). The second member 12 is indirectly (i.e. distantly) connected to the first member 11 through the base member 30. Further the right end portion of the second member 12 and the right end portion of the base member 30 are relatively movable with respect to the second section 122 of the first member 11 because, as shown by a broken line in FIG. 5, the right end portion of the second member 12 and the right end portion of the base member 30 are not connected to the second section 122 of the first member 11. In other words, the second member 12 is movable relative to the first member 11. The tape cassette 60 attached to the receiving portion 8 is noncontactable with the second member 12.

The second member 12 includes a second part 12A having a plate shape and extending in leftward/rightward direction and frontward/rearward direction. The second part 12A is positioned below the tape cassette 60 attached to the receiving portion 8. That is, the second part 12A is positioned forward of the tape cassette 60 in the first direction. The second part 12A and the first part 111A are positioned in line in the leftward/rightward direction, i.e., in the second direction, with a first gap 41 therebetween. Further, the second part 12A and the first part 122A are positioned in line in the leftward/rightward direction with a second gap 42 therebetween. That is, the first member 11 and the second member 12 are positioned in line in the second direction with the first gap 41 and the second gap 42 therebetween. The second gap 42 is positioned opposite to the first gap 41 with respect to the second part 12A.

The second part 12A has an end face 15 facing downward, i.e., facing in the first direction. A circuit board 17 on which a RFID reader 18 and a controller (not illustrated) are mounted is provided at the end face 15. In other words, the RFID reader 18 is provided at the end face 15. The RFID reader 18 is configured to read data stored in the RFID 63 provided at the tape cassette 60. Data read by the RFID reader 18 is output to the controller. The controller includes a CPU configured to control operation performed in the thermal printer 1, and a memory configured to store various data to be processed by the CPU.

In the upward/downward direction parallel to the first direction, a minimum gap length L1 between the second part 12A and the base member 30 is smaller than a minimum gap length L2 between the first part 111A and the contacting position P1. Further, the gap length L2 is substantially equal to a minimum gap length L3 between the first part 122A and the contacting position P2.

Printing operation will next be described with reference to FIGS. 1 through 4. In a state where the tape cassette 60 is attached to the receiving portion 8, and the lid 6 closes the receiving portion 8, the platen holder 14 is at the pressing position, and the RFID reader 18 reads data stored in the RFID 63 and outputs the data to the controller. The controller acquires information on widthwise length of the tape 5 and determines candidates of the heat generating elements in the print head 10 for heat generation. The controller also acquires data indicative of kind of the tape cassette 60, and determines rotation speed of the conveyor motor and temperature of the heat candidates of the generating elements for printing.

The controller permits the conveyor motor to start rotating, so that the ink ribbon take-up shaft 95, the drive shaft 100, and the platen roller 64 are rotated. The ink ribbon paid out from the ink ribbon spool 67A and the tape 5 paid out from the tape spool 65A are discharged through the first guide opening 61, and are moved past the portion between the print head 10 and the platen roller 64 those positioned in the head opening 69.

Further, the controller permits the heat generating elements of the print head 10 to generate heat, so that ink contained in the ink ribbon is transferred to the tape 5. The printing image is a letter, figure, or mark. Hence, an image is printed on the tape 5 by the printing mechanism 70, and the conveying mechanism 105 conveys the tape 5 and the ink ribbon. The ink ribbon goes into the second guide opening 62 is wound over the ink ribbon take-up spool 68A by the rotation of the ink ribbon take-up shaft 95, and the printed tape 5 moves past a portion between the conveyor roller 66 and the tape drive roller 46 and is discharged through the discharge opening 19.

After the controller permits the conveyor motor to stop rotating, and permit the print head 10 to stop heat generation, the controller permits the cutter motor 81 to start rotating. Thus, the cutter mechanism 80 cuts the tape 5, and hence a user can take out the printed tape discharged outside through the discharge opening 19.

As described above, the thermal printer 1 includes the printing mechanism 70, the receiving portion 8, the first member 11, and the second member 12. The printing mechanism 70 performs printing operation. The receiving portion 8 is configured to receive the tape cassette 60. The tape cassette 60 retains the tape 5 on which image is printed by the printing mechanism 70. The tape cassette 60 is provided with the RFID 63. The first member 11 has the first section 111 and second section 122 those constituting the receiving portion 8, and the tape cassette 60 attached to the receiving portion 8 is contactable with the first member 11. The second member 12 is movable relative to the first member 11, and is provided with the RFID reader 18 configured to read data stored in the RFID 63.

With such a structure, even in a case where external force is applied to the first member 11 due to displacement or pivotal movement of the tape cassette 60 relative to the first member 11, such movement being caused by dropping or falling the thermal printer 1, the external force is not likely to be propagated from the first member 11 to the second member 12, since the second member 12 is movable relative to the first member 11 because the second member 12 is indirectly (i.e. distantly) connected to the first member 11 through the base member 30. Accordingly, the RFID reader 18 can be free from any influence of external force.

The first member 11 and the second member 12 are positioned in line in the second direction crossing the first direction. Hence, application of external force directing in the upward/downward direction parallel to the first direction to the RFID reader 18 is unlikely to occur.

The first member 11 and the second member 12 are aligned with each other with the first gap 41 therebetween. Since the first gap 41 can prevent the external force from propagating from the first member 11 to the second member 12, the RFID 63 can be free from influence of the external force.

The force applied from the tape cassette 60 to the receiving portion 8 for attaching the tape cassette 60 to the receiving portion 8 is directed in the first direction, and this force is unlikely to be propagated to the second member 12, since the first member 11 and the second member 12 are aligned with each other in the second direction crossing the first direction which is the attachment direction of the tape cassette 60, and the first gap 41 is defined between the first member 11 and the second member 12. Hence, the RFID reader 18 can further be protected against the external force.

The first member 11 includes the first section 111 and the second section 122. The first section 111 is in aligned in line with the second part 12A of the second member 12 with the first gap 41 therebetween. Further, the second section 122 is aligned in line with the second part 12A of the second member 12 with the second gap 42 therebetween, the second gap 42 being opposite to the first gap 41 with respect to the second part 12A. Since not only the first gap 41 but also the second gap 42 are defined between the first member 11 and the second member 12, propagation of external force from the first member 11 to the second member can further be unlikely to occur. Hence, the RFID reader 18 can further be protected against the external force.

The first section 111 and the second section 122 are separated from each other. More specifically, the first section 111 and the second section 122 are not directly connected to each other but indirectly (i.e. distantly) connected to each other through the third section 133. Therefore, external force applied to one of the first section 111 and the second section 122 is unlikely to be transmitted to the remaining one of the first section 111 and the second section 122. Hence, the RFID reader 18 can further be protected against the external force.

The thermal printer 1 includes the base member 30 at which the first member 11 and the second member 12 are provided. Therefore, accurate positional relationship between the first member 11 and the second member 12 can be provided.

The base member 30 is made from metal, whereas the first member 11 and the second member 12 are made from resin. That is, the base member 30 has rigidity higher than that of the first and second members 11, 12. Even if external force is applied to the first member 11 due to pivotal movement of the tape cassette 60, positional relationship between the first member 11 and the second member 12 is unlikely to be changed because of high rigidity of the base member 30.

Since the base member 30 is made from metal, deformation of the base member 30 is unlikely to occur in comparison with a case where the base member 30 is made from resin. Hence, positional relationship between the first member 11 and the second member 12 can further be maintained.

The thermal printer 1 includes the conveying mechanism 105 provided at the base member 30 and configured to convey the tape 5 on which image is to be printed by the printing mechanism 70. Since the conveying mechanism 105 is supported by the base member 30 made from metal, position of the conveying mechanism 105 can be fixed, and hence, stabilized tape conveying operation can be performed.

The thermal printer 1 includes the cutter mechanism 80 provided at the base member 30 and configured to cut the tape 5 bearing printed image. Since the cutter mechanism 80 is supported by the base member 30 made from metal, position of the cutter mechanism 80 can be fixed, and hence, stabilized cutting operation can be performed.

The first section 111 of the first member 11 includes the first part 111A, and the second member 12 includes the second part 12A. The first part 111A and the second part 12A are arrayed in line in the second direction. Since the first part 111A and the second part 12A are positioned below the tape cassette 60 attached to the receiving portion 8, Further, in the upward/downward direction parallel to the first direction, the minimum gap length L1 between the second part 12A and the base member 30 is smaller than the minimum gap length L2 between the first part 111A and the contacting position P1 between the first member 11 an the tape cassette 60. Hence, mechanical strength of the second member 12 in the first direction can be increased, thereby further protecting the RFID reader 18 against the external force.

The second member 12 has the end face 15 facing in the first direction, and the RFID reader 18 is provided at the end face 15. Since the RFID reader 18 does not face upward, adhesion or deposition of foreign material to the RFID reader 18 can be restrained.

The second member 12 is made from resin. Therefore, communication failure between the RFID 63 and the RFID reader 18 can be restrained.

The receiving portion 8 is configured to receive the take cassette of various kinds. Therefore, a user can use various kind of tapes.

Figure 6:
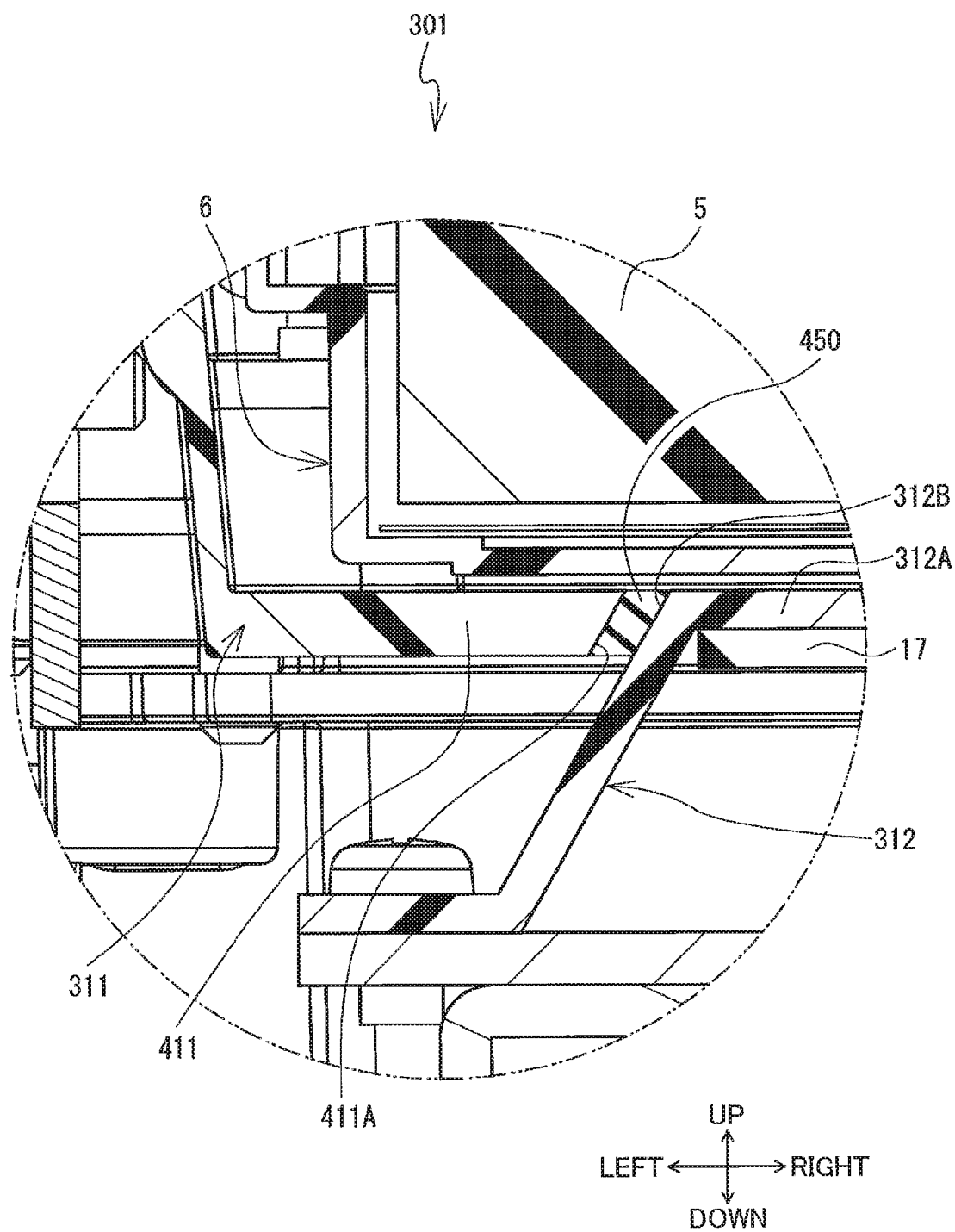
FIG. 6 is a cross-sectional view illustrating an essential portion of a printing device according to a first modified embodiment.

A printing device 301 according to a first modified embodiment will next be described with reference to FIG. 6, wherein like parts and components are designated by the same reference numerals as those shown in FIGS. 1 through 5.

The printing device 301 includes a first member 311 instead of the first member 11, and a second member 312 instead of the second member 12. The first member 311 includes a first section 411 instead of the first section 111. Further, the second member 312 includes a second part 312A instead of the second part 12A.

The first section 411 has a right end face as a first surface 411A, and the second part 312A has a left end face as a second surface 312B. The first surface 411A and the second surface 312B are sloped diagonally leftward in the downward direction, i.e., in the first direction. In other words, the first surface 411A and the second surface 312B are inclined with respect to the direction of array of the first member 311 and the second member 312 and with respect to the first direction. Further, an elastic member 450 is interposed and nipped between the first surface 411A and the second surface 312B.

According to the first modified embodiment, the printing device 301 includes the elastic member 450 that is positioned between the first member 311 and the second member 312. Hence, external force directing from the first member 311 to the second member 312 can be mitigated by the elastic member 450. Accordingly, the RFID reader 18 can be protected against the external force.

The first member 311 has the first surface 411A and the second member 312 has the second surface 312B, and the first and second surfaces 312B are in contact with the elastic member 450. Since the first surface 411A and the second surface 312B are inclined with respect to the first direction, the external force propagated from the first member 311 toward the second member 312 is dispersed in the upward/downward direction parallel to the first direction. Therefore, propagation of external force directing in the second direction toward the second member 312 can be reduced. Accordingly, the RFID reader 18 can further be protected against the external force.

As a modification, one of the first surface 411A and the second surface 312B may be in contact with the elastic member 450, and remaining one of the first surface 411A and the second surface 312B may be spaced away from the elastic member 450. Further, the first surface 411A and the second surface 312B may extend in the first direction as long as the elastic member 450 is positioned therebetween.

Figure 7:
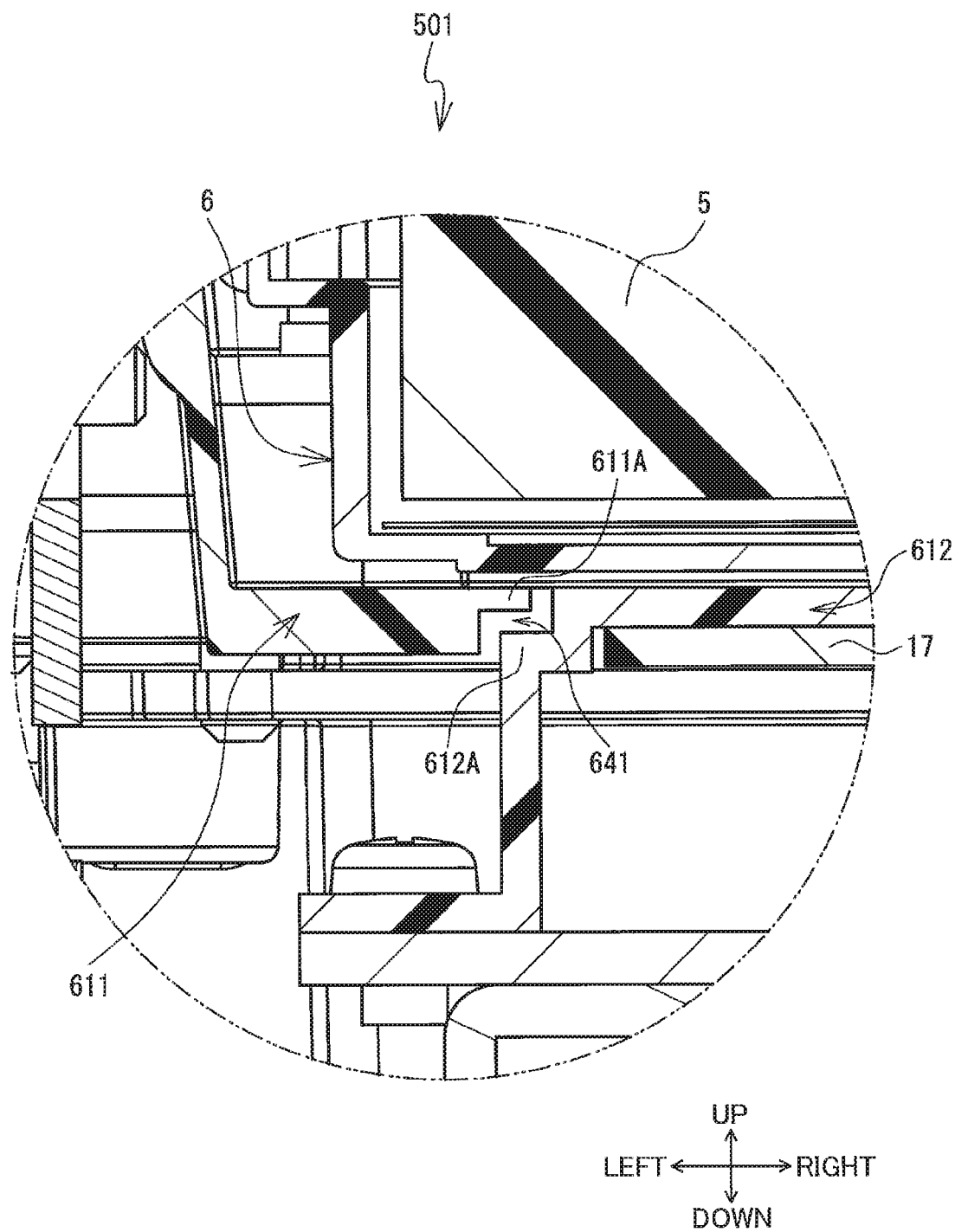
FIG. 7 is a cross-sectional view illustrating an essential portion of a printing device according to a second modified embodiment.

A printing device 501 according to a second modified embodiment will next be described with reference to FIG. 7 wherein like parts and components are designated by the same reference numerals as those shown in FIGS. 1 through 5. The printing device 501 includes a first member 611 instead of the first member 11, and a second member 612 instead of the second member 12.

The first member 611 includes a protrusion 611A protruding rightward toward the second member 612. The second member 612 includes a crank-shaped portion 612A facing the protrusion 611A. The protrusion 611A is in alignment with the second member 612 in the leftward/rightward direction. Further, the protrusion 611A is in alignment with the crank-shaped portion 612A in the first direction. A crank-shaped gap 641 is defined between the protrusion 611A and the crank-shaped portion 612A.

Since the protrusion 611A and the crank-shaped portion 612A are arrayed with each other in the upward/downward direction parallel to the first direction, introduction of foreign material such as dust through the gap 641 can be restrained. That is, a combination of the protrusion 611A and the crank-shaped portion 612A provides a crank-shaped path which prevents the foreign material to pass therethrough. Hence, adhesion of foreign material to the RFID reader 18 can be restrained.

Various modifications are conceivable. For example, instead of the thermal printer 1, an ink jet printer is also available as the printing device. In the latter case, an ink is an example of the consumable goods, and an ink cartridge is an example of the holder. Further, the first section 111 and the second section 122 may be arrayed with each other in the frontward/rearward direction instead of the leftward/rightward direction. The frontward/rearward direction crosses the first direction.

While the description has been made in detail with reference to specific embodiments thereof, it would be apparent to those skilled in the art that various changes and modifications may be made therein without departing from the spirit and scope of the above described embodiments.

What is claimed is:

1. A printing device, comprising:
a printing mechanism configured to perform printing;
a first member having a portion constituting a receiving portion configured to receive therein a holder, the holder retaining therein a consumable goods and being provided with a RFID, the holder being contactable with the portion of the first member when the holder is attached to the receiving portion;
a second member movable relative to the first member;
a RFID reader provided at the second member and configured to read data stored in the RFID;
an elastic member positioned between the first member and the second member, wherein the holder is attached to the receiving portion by moving the holder relative to the receiving portion in a first direction;
wherein the first member and the second member are arrayed with each other in an arraying direction;
wherein the first member has a first surface in contact with the elastic member; and
wherein the second member has a second surface in contact with the elastic member, the first surface and the second surface being inclined with respect to the arraying direction and with respect to the first direction.

2. A printing device comprising:
a printing mechanism configured to perform printing;
a first member having a portion constituting a receiving portion configured to receive therein a holder, the holder retaining therein a consumable goods and being provided with a RFID, the holder being contactable with the portion of the first member when the holder is attached to the receiving portion;
a second member movable relative to the first member; and
a RFID reader provided at the second member and configured to read data stored in the RFID,
wherein the first member and the second member are arrayed with each other with a first gap therebetween,
wherein the holder is attached to the receiving portion by moving the holder relative to the receiving portion in a first direction,
wherein the first member and the second member are arrayed with each other in a second direction crossing the first direction, wherein the first member has a protrusion protruding toward the second member and arrayed with the second member with the first gap therebetween; and
wherein the second member is formed with a notched portion arrayed with the first member with the first gap therebetween, the protrusion and the notched portion being arrayed with each other in a direction parallel to the first direction.

3. A printing device comprising:
a printing mechanism configured to perform printing;
a first member having a portion constituting a receiving portion configured to receive therein a holder, the holder retaining therein a consumable goods and being provided with a RFID, the holder being contactable with the portion of the first member when the holder is attached to the receiving portion;
a second member movable relative to the first member; and
a RFID reader provided at the second member and configured to read data stored in the RFID,
wherein the first member and the second member are arrayed with each other with a first gap therebetween,
wherein the holder is attached to the receiving portion by moving the holder relative to the receiving portion in a first direction,
wherein the first member and the second member are arrayed with each other in a second direction crossing the first direction, wherein the first member has:
a first section arrayed with the second member with the first gap therebetween; and
a second section arrayed with the second member with a second gap positioned opposite to the first gap with respect to the second member, the first section and the second section being the portion constituting the receiving portion.

4. The printing device according to claim 3, further comprising an elastic member positioned between the first member and the second member.

5. The printing device according to claim 3 wherein the first section and the second section are indirectly connected to each other.

6. The printing device according to claim 3, further comprising a base member, the first member and the second member being provided at the base member.

7. The printing device according to claim 6, wherein the base member has a rigidity higher than that of the first member and the second member.

8. The printing device according to claim 7, wherein the base member is made from metal.

9. The printing device according to claim 6, further comprising a conveying mechanism provided at the base member, and configured to convey the consumable goods on which an image is to be formed by the printing mechanism.

10. The printing device according to claim 6, further comprising a cutter mechanism provided at the base member and configured to cut the consumable goods on which an image is printed by the printing mechanism.

11. The printing device according to claim 3,
wherein the second member has an end face in the first direction, the RFID reader being provided at the end face.

12. The printing device according to claim 3, wherein the second member is made from resin.

13. The printing device according to claim 3, wherein the holder is a tape cassette and the consumable goods is a tape.

14. A printing device comprising:
a printing mechanism configured to perform printing;
a first member having a portion constituting a receiving portion configured to receive therein a holder, the holder retaining therein a consumable goods and being provided with a RFID, the holder being contactable with the portion of the first member when the holder is attached to the receiving portion;
a second member movable relative to the first member;
a RFID reader provided at the second member and configured to read data stored in the RFID; and
a base member, the first member and the second member being provided at the base member, wherein the holder is attached to the receiving portion by moving the holder relative to the receiving portion in a first direction;
wherein the first member has a first part;
wherein the second member has a second part arrayed with the first part in a second direction crossing the first direction, the first part and the second part being positioned forward of the holder attached to the receiving portion in the first direction; and
wherein in a direction parallel to the first direction, the second part and the base member provide a minimum gap length therebetween smaller than a minimum gap length between the first part and a contacting position between the first member and the holder.

15. The printing device according to claim 14, wherein the first member and the second member are arrayed with each other with a first gap therebetween.

16. The printing device according to claim 14, wherein the holder is attached to the receiving portion by moving the holder relative to the receiving portion in a first direction; and
wherein the first member and the second member are arrayed with each other in a second direction crossing the first direction.

* * * * *